E. JENKINS.
Hand Dump Carts.

No. 152,642. Patented June 30, 1874.

Attest:

Inventor:
Ephraim Jenkins
by N. Cranford atty.

UNITED STATES PATENT OFFICE.

EPHRAIM JENKINS, OF DURHAM, NEW HAMPSHIRE.

IMPROVEMENT IN HAND DUMP-CARTS.

Specification forming part of Letters Patent No. 152,642, dated June 30, 1874; application filed June 6, 1874.

*To all whom it may concern:*

Be it known that I, EPHRAIM JENKINS, of Durham, in the county of Strafford, in the State of New Hampshire, have invented certain Improvements in Hand Dump-Carts, of which the following is a specification:

The object of this invention is to furnish a hand dumping-cart that will take the place of the common wheelbarrow, and have all the advantages and good qualities, but none of the disadvantages, that are experienced in the use of the one-wheel barrow; and it consists in the construction of the cart, and its arrangement of parts, whereby the objects are obtained, as will be fully hereinafter described.

Figure 1:
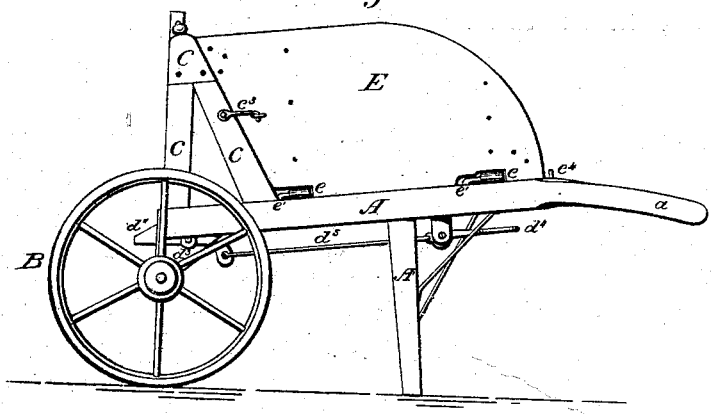
Figure 2:
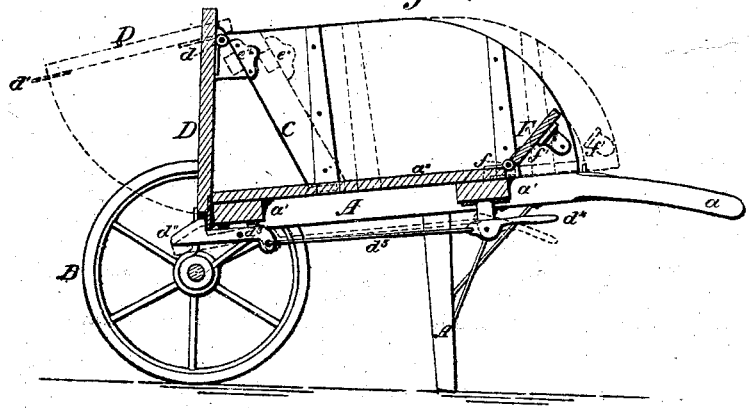
Figure 3:
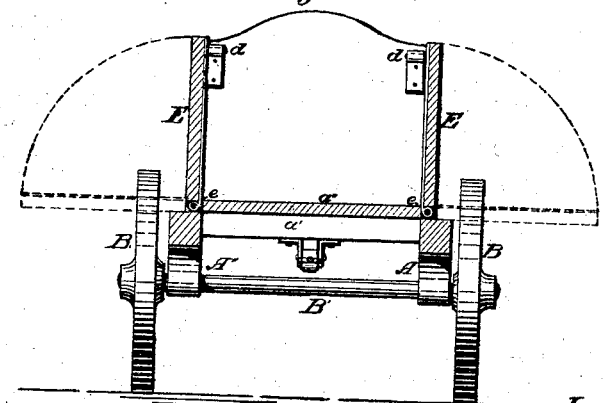

In the drawings, Figure 1 represents a side view of the cart; Fig. 2, a sectional side view, and Fig. 3 a transverse sectional view in part.

A represents the side sills, terminating at their rear ends in handles $a$, and secured to axle B′ by the journal-clips A″, and have the transverse tie-pieces $a'$ $a'$, to give strength to the frame and support the bottom boards $a''$. B B are the two wheels, receiving the axle B′, and upon which they turn when the cart is propelled in either direction. C C are standing angular supports at the forward end of the sills A, and serve to form the angles of the body and hold the sides and front ends of the body in place, and to which they are attached. D is the fore-board, which is hinged at its top edge to the corner supports C by the hinges $d$ $d$, which allow the fore-board to freely swing forward from the bottom of the cart. $d'$ is a metal plate secured upon the inner side of the lower edge of the fore-board D, and as it turns into position to be held fast is caught and so held by the spring-catch $d''$, that is pivoted to the under side of the body at $d^3$, so as to vibrate when the fore-board plate $d'$ swings hard against it, or can be released from its hold upon the plate $d'$ by a hand-lever, $d^4$, that is pivoted to the rear end of the body at $x$, to be convenient to the user to operate; and this lever is, at its forward end, attached to a connecting-rod, $d^5$, that goes forward and is attached to the rear end of the catch $d''$, and so that by bearing down upon the lever $d^4$ the catch $d''$ will fall at its forward end and allow the plate $d'$ on fore-board D to turn forward free from the catch $d''$, and swing upon its hinges $d$ on the upper edge of fore-board D. E E are the removable side-boards of the body, and are secured to the frame A, and held in place by means of eyes $e$ $e$ on the lower edge, which go over hooks $e'$ $e'$, that are attached to the side sills A, and allow the side-boards to be turned outward and down into a horizontal position and forward of the wheels B. $e''$ $e''$ are tenons projecting forward of the front edge of the side-boards and near their top edges, to enter mortises in the corner supports C, so that when the side-boards are pushed forward, and the tenons enter the mortises, the side-boards are held in upright position and cannot then turn over into a horizontal position; and to hold them securely from turning over, and in the upright position, hooks $e^3$ are made fast to the corner supports C, and hook into staples on the side-boards E, which prevents any departure from their position until hooks $e^3$ are released from the side-boards. $e^4$ are projecting studs in the sills A, which prevent the side-boards from sliding too far to the rear when you desire to turn them down into a horizontal position. F is the back-board, hinged at its lower edge, at $f$, to the bottom of the body, so that it can turn down back upon the handles of sides A. $f'$ $f'$ are projecting angular stops, fast on the inner sides of side-boards E, and near their rear ends, to receive and support the back-board F when it is in position to form the rear part of the body of the cart.

By this construction the hand-cart is made into a dump-cart, and is capable of dumping such materials as may be in the body. By releasing the catch from holding the fore-board, and raising the handles $a$, the fore-board will swing forward, when such material forming the load will be precipitated forward out of the cart before the axle; and when the handles are again brought down, so that the supports or legs A′ will strike the ground, the fore-board will swing into position and be caught by the catch $d''$ and be securely held.

It will also be seen that the sides and back-board can be let down into a horizontal position, to admit of a large thing, like a door, ladder, or box, that could not be put into the body, to be placed upon the broad base, by turning the sides and back-board of the body into a horizontal position, thus forming a means of conveyance for things impossible to be conveyed upon a wheelbarrow that has long been needed, and which has never before been accomplished by the means now presented.

Having thus described my invention, what I claim, and desire to secure by Letters Patent, is—

1. A hand dump-cart having its fore-board D hinged to supports C, to swing forward and allow the cart to be dumped, as described.

2. The combination of the pivoted hand-lever $d^4$, connecting-rod $d^5$, and pivoted catch $d''$ with the hinged fore-board of a hand dump-cart, as described.

3. In a hand dump-cart, the hinged side-boards E and back-board F, combined and constructed to operate in the manner and for the purpose described.

EPHRAIM JENKINS.

Witnesses:
   JOSHUA B. SMITH,
   MARY E. SMITH.